United States Patent [19]

Williams, Jr.

[11] Patent Number: 4,994,631
[45] Date of Patent: Feb. 19, 1991

[54] SELF-CLOSING LID FOR WIRING DEVICE COVER

[75] Inventor: Howard M. Williams, Jr., Emmaus, Pa.

[73] Assignee: Hubbell Incorporated, Orange, Conn.

[21] Appl. No.: 362,235

[22] Filed: Jun. 6, 1989

[51] Int. Cl.⁵ .............................................. H02G 3/18
[52] U.S. Cl. ...................... 174/67; 439/142
[58] Field of Search .......................... 174/67; 220/242; 439/136, 142

[56] References Cited

U.S. PATENT DOCUMENTS

| | | | |
|---|---|---|---|
| 3,189,212 | 6/1965 | Bellek | 174/67 X |
| 3,252,611 | 5/1966 | Weitzman et al. | 174/67 X |
| 3,686,425 | 8/1972 | Zerwes et al. | 174/53 |
| 4,036,396 | 7/1977 | Kennedy et al. | 220/242 |
| 4,058,358 | 11/1977 | Carlisle | 339/44 |
| 4,134,516 | 1/1979 | Sullo | 220/242 |
| 4,505,403 | 3/1985 | Bowden et al. | 174/67 X |

Primary Examiner—Leo P. Picard
Assistant Examiner—David A. Tone
Attorney, Agent, or Firm—Jerry M. Presson; Walter C. Farley

[57] ABSTRACT

A self-closing lid is provided for a cover for a wiring device box. The cover has openings to provide access to a receptacle within the box. Each lid is formed with laterally protruding collinear gudgeons which are received in shell-like bearing members molded onto the cover. The lid and cover are each provided with a boss between which a compression coiled spring acts. The line of action of the spring is outside of the axis ine of the gugeons, causing the spring to continually urge the lid to its closed position.

3 Claims, 3 Drawing Sheets

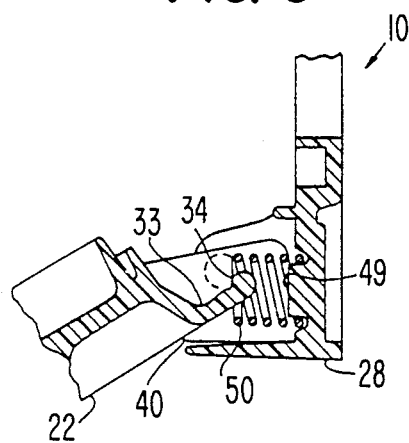
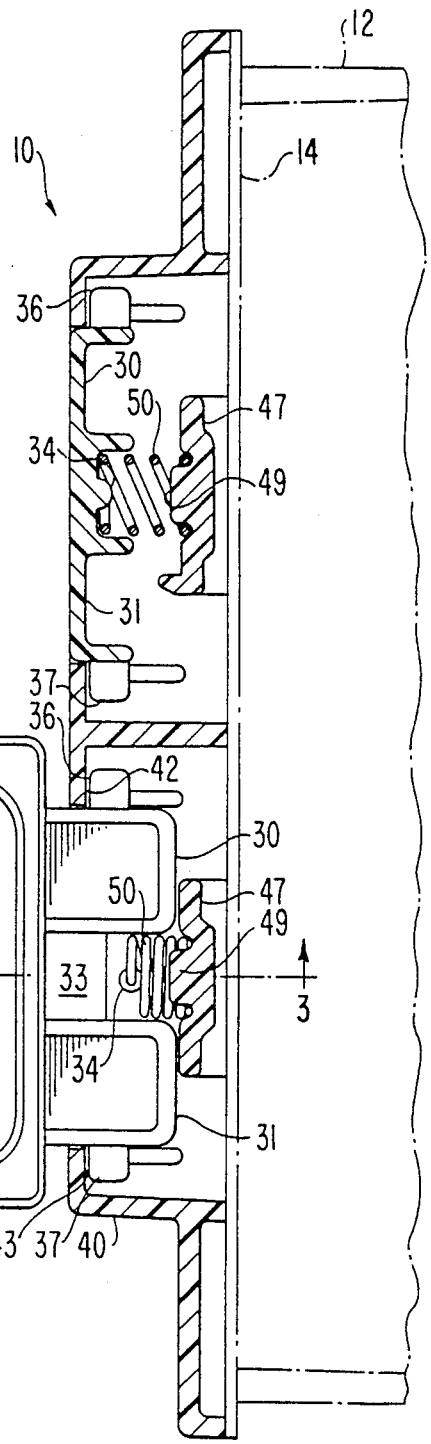

SELF-CLOSING LID FOR WIRING DEVICE COVER

SPECIFICATION

This invention relates to a cover for a box of the type intended to receive a receptacle or other wiring device, particularly one which is intended for outdoor use, having a self-closing lid with an improved structure.

BACKGROUND OF THE INVENTION

The prior art includes covers with lids or doors for use on electrical outlet boxes and the like in wet locations. However, these structures tend to be relatively cumbersome and difficult to manufacture, require numerous components and generally require special spring arrangements in order to urge them toward their closed positions. It is, of course, desirable to have a spring urging the lid or door toward its closed position so that when use of the electrical device has been completed, it will not be left exposed to the elements.

SUMMARY OF THE INVENTION

Accordingly, an object of the present invention is to provide an improved structure for a cover and lid for an electrical box intended to house a wiring device which uses a simple, compression coil spring and is easily manufactured using plastic molding techniques.

Briefly described, the invention comprises a self-closing lid for a wiring device cover including a molded cover attachable to a box and having an opening therethrough to provide access to an electrical device within the box, the cover having a front surface. A lid shaped and dimensioned to close the opening through the cover has a pair of collinear gudgeons protruding outwardly from opposite sides of one end of the lid. Means adjacent one side edge of the cover forms a pair of spaced-apart, arcuate, open-sided bearings opening generally toward the front surface of the cover and dimensioned to receive the gudgeons so that the cover is pivotable through an angle of about 90 between a closed position in which the opening through the cover is closed and an open position. A first boss is located on the cover between the bearings and a second boss is located on the lid between the gudgeons. A compression coil spring extends and acts between the first and second bosses, the center line of the spring being closer to the edge of the cover than to a line between the gudgeons so that the spring urges the cover toward its closed position.

BRIEF DESCRIPTION OF THE DRAWINGS

In order to impart full understanding of the manner in which these and other objects are attained in accordance with the invention, a particularly advantageous embodiment thereof will be described with reference to the accompanying drawings, which form a part of this specification, and wherein:

FIG. 2 is a side elevation in section along line 2—2 of FIG. 1;

FIG. 3 is a partial bottom plan view, in section, along line 3—3 of FIG. 2;

DESCRIPTION OF THE PREFERRED EMBODIMENT

Figure 1:
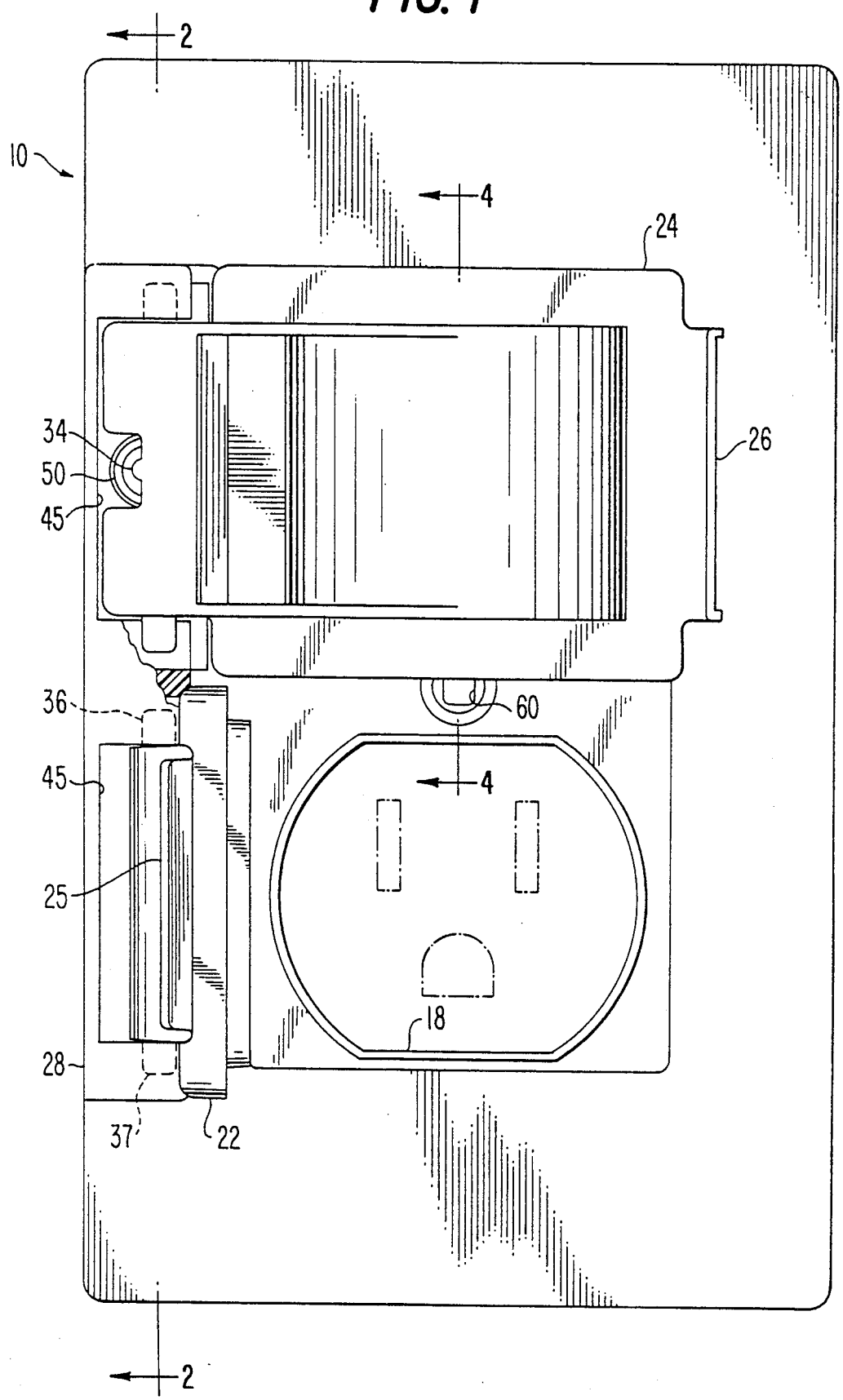
FIG. 1 is a front elevation of a cover and lid structure in accordance with the present invention having two lids, one shown open and one shown closed.

Referring first to FIGS. 1 and 2 together, it will be seen that the apparatus in accordance with the invention comprises a cover 10 which is dimensioned in a conventional fashion to close the open side of an electrical housing or box indicated with phantom lines at 12. A gasket 14 can be provided between the front edge of the box and the cover. Although the cover structure is most conveniently used when it is mounted on a generally vertical surface in the orientation shown in FIG. 1, other orientations can be used.

Cover 10 is molded and is provided, in the embodiment shown, with first and second openings 18 and 20 (FIG. 5) which are shaped and dimensioned in the conventional, standard size and shape to receive the bosses of an electrical receptacle. It is, of course, quite possible to provide a cover of the same type with only one opening, typically a circular opening for a single, circular receptacle boss, and with only one lid.

Each of the openings 18 and 20 is covered by a lid, the lid 22 being provided to cover opening 18 and lid 24 being provided to cover opening 20. Lids 22 and 24 are provided at one end with protruding lips 25 and 26, respectively, to provide a finger grip so that the lids can be individually lifted to provide access to the openings. At the other end of each lid is a hinge structure, adjacent a side edge 28 of the cover, which is of particular interest in the present invention.

The hinge structure for lid 22 will be described in detail, the hinge structure for the other lid being identical.

At the hinged end of lid 22 are two protruding hollow mounting housings 30 and 31 between which is a web 33 having a relatively small nub or boss 34 formed thereon. At the outer surfaces of mounting housings 30 and 31 are short, outwardly protruding stub axles or gudgeons 36 and 37, the central axes of which are aligned.

Figure 5:
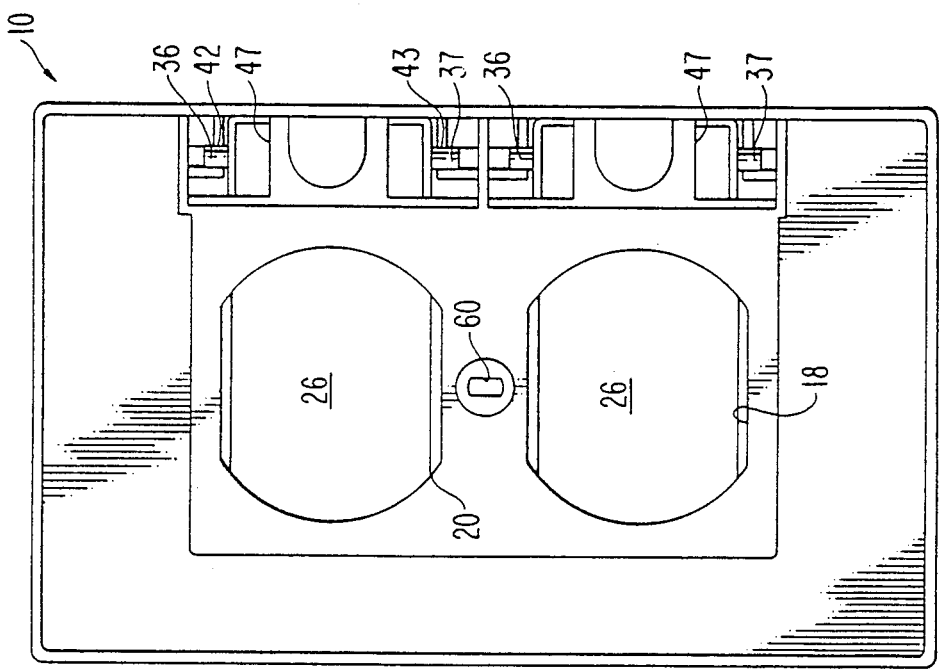
FIG. 5 is a rear elevation of the cover and lid structure of FIG. 1.

Adjacent edge 28 of cover 10 is a bearing structure which is formed in the manner of a shell 40 having arcuate bearing surfaces 42 and 43 which face generally toward the front surface of the cover (see also FIGS. 3 and 5). These bearing surfaces are shaped and dimensioned to receive gudgeons 36 and 37, respectively, so that the gudgeons are rotatable about their central axes. Between each pair of bearing surfaces is a generally U-shaped cut-out portion 45 to receive mounting housings 30 and 31 and to permit those housing portions to move as the gudgeons pivot in the bearings.

The cover is provided with molded support portions 47 on each of which is formed a boss 49. A compression coil spring 50 is positioned with one end surrounding boss 49 and the other end surrounding boss 34 on the lid.

As will be seen particularly in FIGS. 1 and 3, referring to the closed lid structure in FIG. 1, the bosses are positioned so that the central axis of spring 50 is closer to edge 28 of cover 10 than is a line passing through the central axes of collinear gudgeons 36 and 37. Thus, the force of compression coil spring 50 always tends to urge boss 34 away from boss 49, thereby tending to rotate the lid structure clockwise, as seen in FIG. 3, about the gudgeons toward a closed position.

As best seen in FIG. 5, bridge portions 47 lie between the shell portions 40 which define the bearings for the gudgeons, thus permitting the extraction of mold components without lateral movement such that the entire cover structure can be molded in a single piece. The lids, of course, are separately molded and the assembly of the lids on to the cover is a simple matter of inserting the gudgeons in the bearings and inserting the compression coil spring in a compressed form, releasing the spring and allowing the cover to assume its natural, closed state. The spring which is employed is simple, conventional coil spring which requires no custom fitting or sizing, is simple to install and is inexpensive. If necessary, it is also simple to replace.

Figure 4:
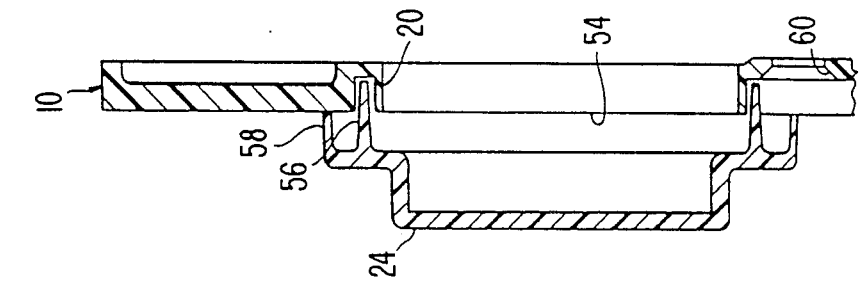
FIG. 4 is a transverse sectional view along line 4—4 of FIG. 1.

It will also be observed that the junction between the lid and cover is formed with a labyrinth-type of seal which requires no gasket. As shown in FIG. 4, each of the openings 18,20 is formed with an upstanding wall 54 which entirely surrounds the opening. The lids, lid 24 being shown in FIG. 4, are formed with a continuous wall 56 around the inside thereof, wall 56 being dimensioned to surround and lie outside of wall 54. An outer peripheral wall 58 abuts the front surface of cover 10 except in that portion between the lids which is occupied by an opening 60 for a mounting screw. The abutment of wall 58 against the front surface of the box diverts a majority of the water which might attempt to enter the openings. The labyrinth seal formed by walls 56 and 54 forms channels by which water which passes wall 58 is caused to flow around the opening and to drain out of the channel at its lowest point. This arrangement has been found to be quite effective to remove rather than simply seal out water from the housing and avoids capillary action which might conduct water into the interior of the wiring device box.

Each cover can be opened to provide access to the receptacle therein and so long as a plug is in the receptacle, the lid is simply allowed to rest against the plug. When the plug is removed, the lid immediately snaps to the closed position in which its associated opening is covered.

While one advantageous embodiment has been chosen to illustrate the invention, it will be understood by those skilled in the art that various changes and modifications can be made therein without departing from the scope of the invention as defined in the appended claims.

What is claimed is:

1. A self-closing lid structure for a wiring device cover comprising the combination of
    a molded cover attachable to a box and having an opening therethrough to provide access to an electrical device within the box, said cover having a front surface;
    a lid shaped and dimensioned to close said opening through said cover, said lid having a pair of collinear gudgeons protruding outwardly from opposite sides of one end thereof;
    means adjacent one side edge of said cover forming a pair of spaced-apart bearings dimensioned to receive said gudgeons so that said cover is pivotable through an angle of about 90° between a closed position in which said opening through said cover is closed and an open position;
    a first boss on said cover between said bearings;
    a second boss on said lid between said gudgeons; and
    a compression coil spring extending and acting between said first and second bosses, the centerline of said spring being closer to said one edge of said cover than a line between said gudgeons whereby said spring urges said cover toward said closed position.

2. A lid structure according to claim 1 wherein each of said bearings is an arcuate, open-sided bearing opening generally toward said front surface of said cover, and wherein the force of said spring tends to hold said gudgeons in contact with said bearings.

3. A lid structure according to claim 2 wherein said means defining said opening through said cover includes a first continuous flange surrounding said opening and projecting toward said lid away from adjacent portions of said front surface of said cover, and wherein said lid includes a second continuous flange which surrounds and is spaced from said first flange when said lid is in said closed position.

* * * * *